Patented Nov. 21, 1950

2,530,872

UNITED STATES PATENT OFFICE 2,530,872

ESTERS OF SULFUR-CONTAINING POLYCARBOXYLIC ACIDS

James T. Gregory, Cuyahoga Falls, and Jacob Eden Jansen, Akron, Ohio, assignors to The B. F. Goodrich Company, New York, N. Y., a corporation of New York No Drawing. Application June 18, 1947, Serial No. 755,478

3 Claims. (Cl. 260—30.8)

This invention relates to new compositions of matter, and pertains more specifically to new esters of sulfur-containing polycarboxylic acids.

It is disclosed in our copending application, Serial No. 755,476, filed June 17, 1947, that new acids having the general formula

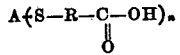

wherein A is a polyvalent aliphatic radical having its connecting valences on carbon atoms and containing only atoms of carbon, hydrogen and sulfur or oxygen (i. e., a chalcogen occurring in one of the short periods of the periodic table), the sulfur or oxygen being present in the divalent state and being connected by each of its two valences to two different carbon atoms; R is a bivalent aliphatic hydrocarbon radical, preferably containing from 1 to 4 carbon atoms, and $n$ is a number equal to the valence of A, preferably from 2 to 4, may be readily prepared in good yields by reacting a chlorine-containing compound of the formula $A(Cl)_n$, wherein A and $n$ have the meaning set forth hereinabove, with a mercapto-acid of the formula

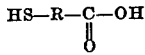

wherein R has the same meaning as above, in the presence of an alkali metal hydroxide, and then acidifying the reaction mixture.

We have now found that esters of acids of the above general class, and particularly those having the formula

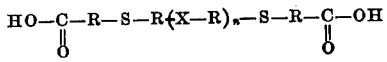

wherein R is a bivalent aliphatic hydrocarbon radical containing from 1 to 4 carbon atoms; X is a chalcogen occurring in one of the short periods of the periodic table; and $n$ is a number equal to the number of (X—R) groups present, preferably from 1 to 4, may readily be prepared in good yields by a simple esterification reaction. We have further found that the esters thus formed are very useful as plasticizers and modifying agents for natural and synthetic resins and rubbers, cellulose derivatives and the like.

The alcohol which is used in the esterification reaction may be any saturated or unsaturated primary, secondary, or tertiary mono- or polyhydroxy, substituted or unsubstituted alcohol. Among these are: primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, cetyl alcohol, octadecyl alcohol, and the like;

Secondary alkyl alcohols such as isopropyl alcohol, secondary butyl alcohol, secondary amyl alcohol, secondary hexyl alcohol, secondary octyl alcohol, secondary nonyl alcohol and the like;

Tertiary alkyl alcohols such as tertiary butyl alcohol, tertiary amyl alcohol, tertiary butyl carbino, tertiary amyl carbinol, pinacoylyl alcohol, and the like;

Aromatic alcohols such as benzyl alcohol, methylphenylcarbinol, phenylethyl alcohol and the like;

Alicyclic alcohols such as cyclohexanol, cyclobutylcarbinol, cyclopentanol, and the like;

Heterocyclic alcohols such as furfuryl and tetrahydrofurfuryl alcohols and the like;

Polyhydroxy alcohols such as glycerine, erythritol, penta-erythritol, arabitol, xylitol, adonitol, mannitol, dulcitol, sorbitol, pentaglycerine, xylylene glycols, and particularly ethylene glycol, diethylene glycol, triethylene glycol, tetraethylene glycol, penta-ethylene glycol, trimethylene glycol, tetramethylene glycol, nonamethylene glycol, undecamethylene glycol, isobutylene glycol, 2,2-dimethyl trimethylene glycol, 1,2-butanediol, 1,3-butanediol, 3-methyl-1,3-butanediol, 2,3-butanediol, pinacol, 2-ethyl-1,3-hexanediol, and the like;

Unsaturated aliphatic alcohols such as allyl alcohol, methallyl alcohol, crotyl alcohol, propargyl alcohol and the like;

Substituted alcohols such as ethoxy ethyl alcohol, ethylene chlorohydrin, cyanohydrin, 2-bromoethanol, and the like.

As mentioned hereinabove the esters of this invention are prepared from a sulfur-containing polycarboxylic acid of the type described above and an alcohol by a simple esterification reaction. Such a reaction is preferably carried out by admixing the acid and the alcohol either alone or in presence of a solvent, and then heating the reaction mixture, preferably at the reflux temperature of the alcohol or the solvent for a time sufficient for esterification to occur. An esterification catalyst such as a small amount of hydrochloric acid may be used, if desired, but the esters are obtained in high yields in a period of about 2 to 24 hours in the absence of any catalyst. When a monohydric alcohol is used the quantity of alcohol is preferably in excess of one mole of alcohol for each carboxyl group present in the acid, in which event neutral esters are secured, but partial esters of the polycarboxylic acid, in which not all of the carboxyl groups are esterified, may also be prepared by using a lesser amount of alcohol. Mixed esters of the polycarboxylic acid with different alcohols are also contemplated by this invention and may be secured by a partial exchange reaction between a neutral ester of the acid with an alcohol, and a second higher-boiling alcohol.

The esters of this invention derived from monohydric alcohols are generally high-boiling liquids, but the esters derived from the sulfur-containing polycarboxylic acids and polyhydric alcohols are often semi-solid and somewhat resinous in character due to polycondensation between several molecules of the acid and the alcohol.

Specific examples of esters of this invention include the following: (The nomenclature used is that given in Chemical Abstracts, 39, page 5924, paragraph 297).

1.

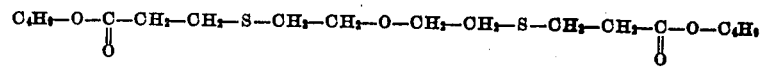

dibutyl 4,10-dithia-7-oxatridecandioate

2.

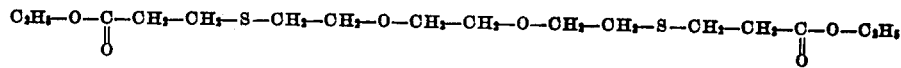

diethyl 4,13-dithia-7,10-dioxahexadecandioate

3.

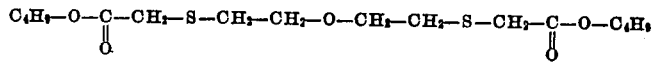

dibutyl 3,9-dithia-6-oxaundecandioate

4.

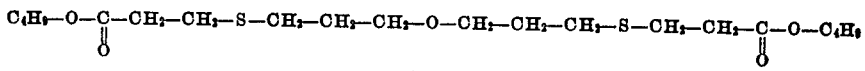

dibutyl-4,12-dithia-8-oxapentadecandioate

5.

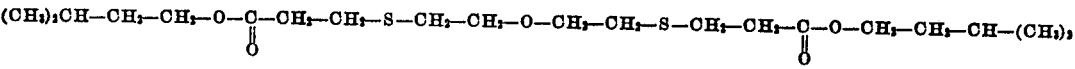

diisoamyl 4,10-dithia-7-oxatridecandioate

6.

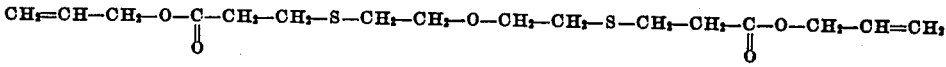

diallyl 4,10-dithia-7-oxatridecandioate

7.

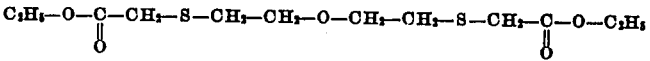

diethyl 3,9-dithia-6-oxaundecandioate

8.

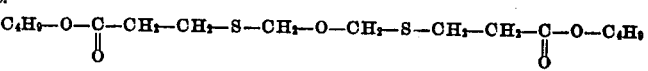

dibutyl 4,8-dithia-6-oxaundecandioate

9.

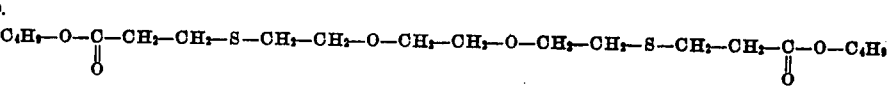

dibutyl 4,13-dithia-7,10-dioxahexadecandioate

10.

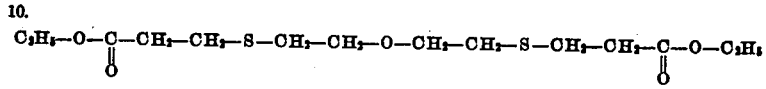

diethyl 4,10-dithia-7-oxatridecandioate

11.

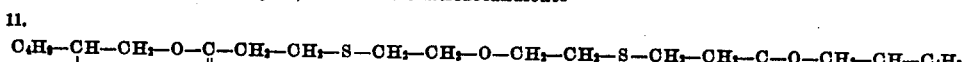

di-2-ethylhexyl-4,10-dithia-7-oxatridecandioate

12.

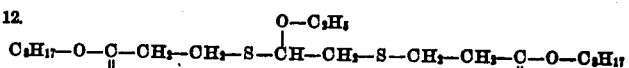

di-n-octyl 4,7-dithia-5-ethoxy-decandioate

13.

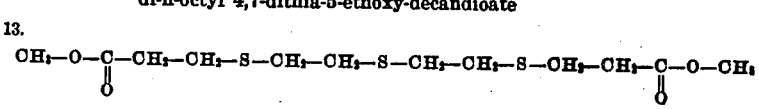

dimethyl 4,7,10-trithiatridecandioate

14.

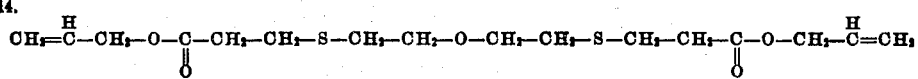

diallyl 4,10-dithia-7-oxatridecandioate

15.

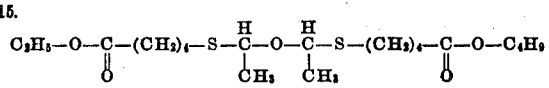

ethyl butyl 6,10-dithia-8-oxa-7,9-dimethyl-pentadecandioate

16.

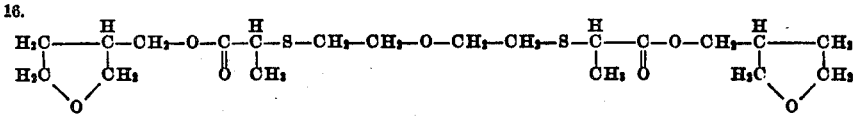

di-tetrahydrofurfuryl 3,9-dithia-6-oxa-2,10-dimethyl undecandioate

17.

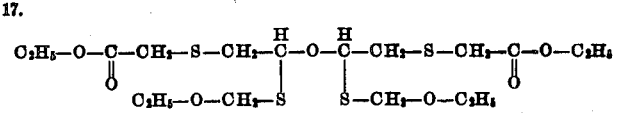

diethyl 3,9-dithia-6-oxa-5,7-(di-ethoxy-methyl-thio)-undecandioate

As is apparent from the above specific compounds various other compounds of the formula

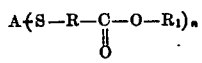

wherein A is a radical of the type set forth hereinabove and including radicals of the types

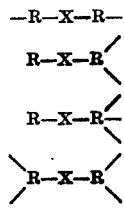

wherein X is oxygen or sulfur and R is an aliphatic hydrocarbon radical;

R is a bivalent aliphatic hydrocarbon radical either straight chain or branched and having its connecting valences on the same or different carbon atoms;

N is a number from 2 to 4, and $R_1$ is the radical of a monohydric alcohol, are also included within the scope of this invention.

All of these monohydric alcohol esters are quite useful as plasticizers for a wide variety of solid plasticizable materials.

One particularly important class of materials which may be plasticized with the esters of this invention are the vinyl halide polymers such as alpha, beta, or gamma polyvinyl chloride, polyvinyl bromide, polyvinyl fluoride, or copolymer of vinyl chloride with minor proportions of polymerizable unsaturated compounds such as vinyl acetate, vinyl bromide, vinyl fluoride, vinyl cyanide, vinyl propionate, vinyl butyrate, vinylidene chloride, vinylidene bromide, styrene, acrylonitrile, methyl acrylate, methyl methacrylate, methyl ethacrylate, ethyl methacrylate, maleic acid or anhydride, esters of maleic or of chloromaleic acid, esters of croton'c acid, and other similar copolymerizable materials. By "minor proportion" is meant less than 50% by weight of the total monomeric materials. Polymers made from monomeric materials consisting predominantly of vinyl chloride are especially well plasticized by the materials of this invention.

Such vinyl halide polymer compositions prepared using the esters of this invention as plasticizers, have many uses where special properties are required, such as resistance to acids, alkalies, oxidizing agents or oils and greases. Such compositions may be prepared by any of the usual methods, such as by mixing the polymer with the plasticizer on a hot roll mill or in an internal mixer. Stocks of varying physical properties may be secured, depending upon the proportion of plasticizer used. Compositions containing from 10 parts or even less to 150 parts or more for each 100 parts of the polymer may be used with good results, but the use of 20 to 80 parts of plasticizer to 100 parts of polymer is preferred for most purposes. Pigments and fillers such as clay, barytes, carbon black, whiting, etc. which are in common use in the rubber and plastics industries may also be used in the compositions. In order to obtain special properties other plasticizers may also be used in the same compositions, and stabilizers such as the lead salts of fatty acids or the esters of unsaturated monocarboxylic acids or other materials may be added to give greater stability toward heat and light.

Specific examples of compositions in which the esters of this invention are used as plasticizers are prepared in the following manner: 15 parts by weight of polyvinyl chloride powder are placed in a container with 10 parts of the plasticizer and mixed. This mixture is then placed on a mixing mill at about 220° F. and its behavior observed as the temperature of the mill rises. When the milling temperature is reached, the plasticizer and the polyvinyl chloride are compatible and the stock may be cut without tearing a ragged edge. At this point the stock has no "nerve," that is, it does not shrink when a section is cut. After plasticization is complete, the stock is sheeted off the mill and molded into a sheet of approximately .020 inch thickness. The color, odor, and clarity of the resulting sheet are noted as an indication of the stability of the stock and the compatibility of the plasticizer. A portion of the sheet is examined at room temperature on aging, while another portion is placed in a forced-draft oven at 90° C. for four days, and its loss in weight taken as a measure of the plasticizer volatility in the stock. The appearance of the heat loss sample is also an indication of the stock's heat stability. An impact test is used to determine the behavior of the plasticized stocks at low temperatures. The brittleness temperature is taken as the lowest temperature at which a sample from the molded sheet will withstand the deformation in the test without cracking.

The results of the above tests on a number of the esters of this invention are given in the following table. Dioctyl phthalate, one of the most commonly used plasticizers for polyvinyl chloride, is used as a control.

One batch of stock is prepared using an ester of this invention, dibutyl-4,10-dithia-7-oxatridecandioate, as plasticizer, and another batch is prepared using a triethylene glycol ester of mixed fatty acids, one of the most commonly used plasticizers for synthetic rubber, as the plasticizer. Tests for tensile strength, elongation, compression set, brittleness temperature, heat loss, and

| Example | Compound Name | Milling Temperature | Molded | Bleeding in Air | Heat Loss (4 days at 90° C.) | | Brittleness Temperature |
|---|---|---|---|---|---|---|---|
| | | | | | Per Cent on stock | Per Cent on Plasticizer | |
| | | °F. | | | | | °C. |
| I | Dioctyl phthalate control | 260 | Clear | None at three weeks | 9.45 | 23.60 | −35 |
| II | Dibutyl 4,13-dithia-7,10-dioxahexadecandioate | 245 | ...do | ...do | 1.22 | 3.22 | −60 |
| III | Diethyl 4,13-dithia-7,10-dioxahexadecandioate | 250 | ...do | ...do | 0.34 | 0.85 | −60 |
| IV | Dibutyl 3,9-dithia-6-oxaundecandioate | 240 | ...do | ...do | 6.14 | 15.35 | −65 |
| V | Dibutyl 4,12-dithia-8-oxapentadecandioate | 245 | ...do | ...do | 0.25 | 0.63 | −65 |
| VI | Diallyl 4,10-dithia-7-oxatridecandioate | 240 | ...do | ...do | 3.62 | 9.05 | −65 |
| VII | Dibutyl 4,10-dithia-7-oxatridecandioate | 240 | ...do | ...do | 0.7 | 1.8 | −60 |
| VIII | Diethyl 4,10-dithia-7-oxatridecandioate | 235 | ...do | ...do | 6.8 | 17.1 | −60 |
| IX | Di-2-ethylhexyl 4,10-dithia-7-oxatridecandioate | 245 | ...do | ...do | 0 | 0 | −60 |
| X | Di-isoamyl 4,10-dithia-7-oxatridecandioate | 240 | ...do | ...do | 0 | 0.1 | −60 |
| XI | Dibutyl 4,8-dithia-6-oxaundecandioate | 240 | ...do | ...do | 13 | 32.5 | −60 |

It can be seen from the above table that when the esters of this invention are used as plasticizers for polyvinyl chloride, the milling temperature is substantially lowered, the molded film is clear, and there is no bleeding of the plasticizer in air. Furthermore, the heat loss is greatly reduced, and low temperature properties substantially improved.

In addition to being excellent plasticizers for the above-named materials, the esters of this invention are also very valuable plasticizers for synthetic rubbers such as polymers of butadiene, isoprene, chloroprene, and similar polymerizable open-chain aliphatic conjugated dienes as well as copolymers of these and similar materials with each other or with such materials as styrene, acrylonitrile, isobutylene and other monomers copolymerizable therewith as well as mixtures of any of the above materials with each other or with natural rubber. When the above synthetic rubbers are plasticized with the esters of this invention, reduction in hardness and modulus, increased elongation, improved resilience, and better low temperature flexibility are obtained. Furthermore, the stocks containing the new esters have improved compression set and heat loss properties, and the plasticizer will not "bleed" from the stock, even when used in high concentrations. To illustrate the improvements listed above, stocks are prepared according to the following compounding recipe, using a copolymer synthetic rubber comprising 55% by weight of butadiene-1,3 and 45% by weight of acrylonitrile:

| | Parts |
|---|---|
| Butadiene-acrylonitrile copolymer | 100.0 |
| Zinc oxide | 5.0 |
| Stearic acid | 0.5 |
| Carbon black | 60.0 |
| 2,2'-benzothiazyl disulfide | 1.5 |
| Sulfur | 1.5 |
| Plasticizer | as shown in following table | bleeding in air are then conducted. Results of these tests are compiled in the following table:

| | dibutyl-4,10-dithia-7-oxatridecandioate | | triethylene glycol ester of mixed fatty acids | |
|---|---|---|---|---|
| Parts used | 20 | 30 | 20 | 30 |
| Bleeding of stock | none | none | none | ------ |
| Tensile strength | 3,600 | 3,450 | 3,200 | 3,100 |
| Elongation | 580 | 620 | 553 | 593 |
| Compression set | 24.8 | 29.2 | 36.1 | 41.7 |
| Brittleness temperature °C | −40 | −45 | −35 | −40 |
| Heat loss (70 hours at 90° C.): | | | | |
| Based on rubber per cent | .38 | .605 | .56 | 1.05 |
| Based on plasticizer do | 4.05 | 4.01 | 6.42 | 5.94 |

The superiority of the compounds of this invention as plasticizers for synthetic rubber is readily apparent.

Other materials which may be advantageously plasticized with the esters of this invention include polymers and copolymers derived predominantly from alkyl acrylates and methacrylates, vinylidene chloride, acrylonitrile, styrene, ethylene, vinyl acetate and various other unsaturated compounds as well as cellulose acetate, cellulose nitrate and other resinous materials.

Although specific embodiments of the invention have been herein disclosed, it is not intended to limit the invention thereto, for numerous modifications and variations will be apparent to those skilled in the art, and are included within the scope of the appended claims.

We claim:

1. A composition of matter comprising a rubbery copolymer of butadiene-1,3 and acrylonitrile and, as a plasticizer therefor, from about 20 to 30 parts by weight based on 100 parts by weight of the said copolymer of a compound of the formula

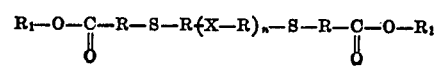

wherein X is a chalcogen occurring in one of the short periods of the periodic table, R is a bivalent aliphatic hydrocarbon radical containing from 1 to 4 carbon atoms, R₁ is a monohydric alcohol radical containing from 1 to 18 carbon atoms, and $n$ is an integer from 1 to 4, said composition being characterized in that the said plasticizer is retained by the said copolymer at high temperatures and imparts thereto, in addition to enhanced softness and elasticity, the ability to remain flexible at substantially lower temperatures, all without substantially lowering its tensile strength.

2. A composition of matter comprising a rubbery copolymer of butadiene-1,3 and acrylonitrile, and as a plasticizer therefor, from about 20 to 30 parts by weight based on 100 parts by weight of the said copolymer of a compound of the formula

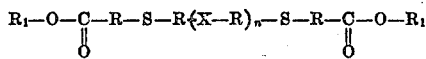

wherein X is a chalcogen occurring in one of the short periods of the periodic table, R is a bivalent aliphatic hydrocarbon radical containing from 1 to 4 carbon atoms, R₁ is an alkyl radical containing from 1 to 18 carbon atoms, and $n$ is an integer from 1 to 4, said composition being characterized in that the said plasticizer is retained by the said copolymer at high temperatures and imparts thereto, in addition to enhanced softness and elasticity, the ability to remain flexible at substantially lower temperatures, all without substantially lowering its tensile strength.

3. A composition of matter comprising a rubbery copolymer of butadiene-1,3 and acrylonitrile, and as a plasticizer therefor, from about 20 to 30 parts by weight based on 100 parts by weight of the said copolymer of dibutyl-4,10-dithia-7-oxa-tridecandioate, said composition being characterized in that the said plasticizer is retained by the said copolymer at high temperatures and imparts thereto, in addition to enhanced softness and elasticity, the ability to remain flexible at substantially lower temperatures, all without substantially lowering its tensile strength.

JAMES T. GREGORY.
JACOB EDEN JANSEN.

REFERENCES CITED

The following references are of record in the file of this patent:

UNITED STATES PATENTS

| Number | Name | Date |
|---|---|---|
| 2,389,489 | Dean et al. | Nov. 20, 1945 |
| 2,393,327 | Langkammerer | Jan. 22, 1946 |